(12) United States Patent
Shimada et al.

(10) Patent No.: US 9,001,203 B2
(45) Date of Patent: Apr. 7, 2015

(54) SYSTEM AND PROGRAM FOR GENERATING INTEGRATED DATABASE OF IMAGED MAP

(75) Inventors: Tadao Shimada, Yokohama (JP); Tsuneki Sakakibara, Yokohama (JP); Tatsuya Hirai, Yokohama (JP)

(73) Assignee: Pasco Corporation, Tokyo (JP)

( * ) Notice: Subject to any disclaimer, the term of this patent is extended or adjusted under 35 U.S.C. 154(b) by 378 days.

(21) Appl. No.: 13/389,922

(22) PCT Filed: Aug. 12, 2010

(86) PCT No.: PCT/JP2010/063711
§ 371 (c)(1),
(2), (4) Date: Feb. 10, 2012

(87) PCT Pub. No.: WO2011/019071
PCT Pub. Date: Feb. 17, 2011

(65) Prior Publication Data
US 2012/0140063 A1    Jun. 7, 2012

(30) Foreign Application Priority Data

Aug. 13, 2009 (JP) .................................. 2009-187896

(51) Int. Cl.
*H04N 7/18* (2006.01)
*G01C 11/12* (2006.01)
(Continued)

(52) U.S. Cl.
CPC .............. *G01C 11/12* (2013.01); *G01B 11/026* (2013.01); *G01C 11/14* (2013.01); *G01C 15/00* (2013.01); *H04N 5/772* (2013.01); *H04N 9/8205* (2013.01)

(58) Field of Classification Search
CPC .................... G01C 11/00–11/34; G03B 17/20; H04N 2101/00; G01N 21/4738; H04N 9/8205
USPC .......................................... 348/135; 382/106
See application file for complete search history.

(56) References Cited

U.S. PATENT DOCUMENTS 6,346,980 B1   2/2002   Tani et al.
6,507,406 B1   1/2003   Yagi et al.
(Continued)

FOREIGN PATENT DOCUMENTS

CN    101009775 A    8/2007
JP    A-11-122638    4/1999
(Continued)

OTHER PUBLICATIONS

International Search Report issued in International Patent Application No. PCT/JP2010/063711 dated Sep. 7, 2010.
(Continued)

*Primary Examiner* — Geepy Pe
*Assistant Examiner* — Matthew J Anderson
(74) *Attorney, Agent, or Firm* — Oliff PLC

(57) ABSTRACT

A photography unit photographs a target, a control unit acquires distance data between a photography position and a target to be photographed of the photography unit, an azimuth angle and an elevation/depression angle of a photography direction of the photography unit together with the image information by an angle distance measurement unit synchronously or asynchronously to the shutter operation of the photography unit. The angle distance measurement unit has a configuration without using an axis fixed onto a mobile object. Coordinate information of the photography position of the photography unit is acquired from the coordinate measurement unit synchronously to asynchronously to the shutter operation. The control unit calculates coordinate information of a photographing target, based on the data of the acquired distance data, the azimuth, elevation and depression angles, and the coordinate information.

4 Claims, 6 Drawing Sheets

(51) Int. Cl.
*G01C 11/14* (2006.01)
*G01C 15/00* (2006.01)
*H04N 5/77* (2006.01)
*H04N 9/82* (2006.01)
*G01B 11/02* (2006.01)

(56) References Cited

U.S. PATENT DOCUMENTS

| | | | |
|---|---|---|---|
| 6,694,064 B1 * | 2/2004 | Benkelman | 382/284 |
| 6,882,435 B2 | 4/2005 | Yagi et al. | |
| 7,555,143 B2 * | 6/2009 | Flath et al. | 382/109 |
| 7,773,799 B2 * | 8/2010 | Oldroyd | 382/154 |
| 7,843,496 B2 * | 11/2010 | Uchiyama et al. | 348/231.3 |
| 7,860,273 B2 * | 12/2010 | Kochi et al. | 382/103 |
| 7,933,001 B2 * | 4/2011 | Otani et al. | 356/3.14 |
| 8,044,991 B2 * | 10/2011 | Lea et al. | 348/25 |
| 8,284,190 B2 * | 10/2012 | Muktinutalapati et al. | 345/419 |
| 8,294,881 B2 * | 10/2012 | Hellickson et al. | 356/5.01 |
| 8,416,130 B2 * | 4/2013 | Scherzinger | 342/357.23 |
| 8,493,442 B2 * | 7/2013 | Fernandez et al. | 348/143 |
| 8,572,077 B2 * | 10/2013 | Dorfman et al. | 707/729 |
| 8,717,432 B2 * | 5/2014 | Otani et al. | 348/135 |
| 8,725,399 B2 * | 5/2014 | Nonaka | 701/420 |
| 8,811,718 B2 * | 8/2014 | Anai et al. | 382/154 |
| 2003/0231243 A1 * | 12/2003 | Shibutani | 348/207.99 |
| 2004/0257441 A1 * | 12/2004 | Pevear et al. | 348/144 |
| 2005/0104771 A1 * | 5/2005 | Terry et al. | 342/195 |
| 2006/0116850 A1 * | 6/2006 | Krumm | 702/150 |
| 2006/0182314 A1 * | 8/2006 | England et al. | 382/106 |
| 2006/0215027 A1 | 9/2006 | Nonoyama et al. | |
| 2007/0208507 A1 * | 9/2007 | Gotoh | 701/210 |
| 2007/0236581 A1 | 10/2007 | Uchiyama et al. | |
| 2008/0069404 A1 * | 3/2008 | Lee et al. | 382/106 |
| 2008/0125962 A1 * | 5/2008 | Wipplinger et al. | 701/201 |
| 2008/0174679 A1 * | 7/2008 | Tanino | 348/231.99 |
| 2009/0021598 A1 * | 1/2009 | McLean et al. | 348/222.1 |
| 2009/0303348 A1 * | 12/2009 | Inatomi et al. | 348/231.3 |
| 2009/0322742 A1 * | 12/2009 | Muktinutalapati et al. | 345/420 |

FOREIGN PATENT DOCUMENTS

| | | |
|---|---|---|
| JP | A-11-331831 | 11/1999 |
| JP | A-2000-346634 | 12/2000 |
| JP | A-2001-91253 | 4/2001 |
| JP | A-2001-343213 | 12/2001 |
| JP | A-2004-226190 | 8/2004 |
| JP | A-2007-240506 | 9/2007 |
| JP | A-2007-295002 | 11/2007 |
| WO | WO 2004/113836 A1 | 12/2004 |

OTHER PUBLICATIONS

Nov. 5, 2013 Chinese Office Action issued in Chinese Application No. 201080035796.4 (with Japanese-language translation and partial English-language translation).

* cited by examiner

SYSTEM AND PROGRAM FOR GENERATING INTEGRATED DATABASE OF IMAGED MAP

BACKGROUND

1. Technical Field

The present invention relates to a system and program for generating integrated database of imaged map.

2. Description of the Related Art

Conventionally, according to the proposed techniques, a camera that is mounted on such as an airplane is used for photographing an image of a ground surface, to specify the position of a target ground surface. For example, Japanese Patent Application Laid-Open No. 11-331831 discloses a position-reading unit which can read and register a damaged point in real time, while the images output by a TV camera are watched. This TV camera is mounted on an airplane, and takes photos always in a perpendicular downward direction. Japanese Patent Application Laid-Open No. 2001-343213 discloses a position specification unit which photographs an image of a ground surface using a camera mounted on a mobile object, such as an airplane, and specifies the absolute position of the target to be photographed, based on a photography direction of the camera, a travel direction of the mobile object, the absolute position of the mobile object, and the distance between the camera and the target to be photographed.

The conventional technique of Japanese Patent Application Laid-Open No. 11-331831 has a problem that the photography direction of a camera is limited only to a perpendicular downward direction, thus has a very low degree of freedom in the photography direction.

The conventional technique of Japanese Patent Application Laid-Open No. 2001-343213 has a problem that the azimuth direction cannot be decided, when the operator performs the photographing while holding the camera in hand. This is because the rotational angle of the camera is obtained with respect to the axis fixed on a mobile object (for example, airplane), and the azimuth angle is determined based on this rotational angle and the traveling direction of the mobile object.

SUMMARY

One object of the present invention is to provide a photographing target position specification unit which can acquire a position of a target object to be photographed in an arbitrary direction, a unit for generating integrated database of imaged map, and a program for specifying a position of a target object to be photographed, without using the axis fixed on a mobile object.

According to an aspect of the present invention, there is provided a system for generating integrated database of imaged map, including: a photographing target position specification unit including a photography element which photographs a photographing target in an arbitrary photography direction from an arbitrary photography position, a distance measurement element which includes a laser distance meter for measuring a distance between the photography position and the photographing target, an azimuth angle measurement element which measures an azimuth angle of the photography direction based on geomagnetism, an elevation/depression angle measurement element which measures an elevation/depression angle of the photography direction, a coordinate measurement element which measures a coordinate of the photography position, and a photographing target coordinate calculation element which calculates coordinate information of the photographing target, based on the coordinate of the photography position, the distance, the azimuth angle, and the elevation/depression angle; a geographical information data output unit which outputs data on a geographical information system, the data including image information of the photographing target photographed by the photography element and the coordinate information of the photographing target which is calculated by the photographing target coordinate calculation element in association with each other; and a display unit which displays the image information of the photographing target that is output by the geographical information data output unit, in a position of the photographing target on a map based on the coordinate information, and wherein the display unit displays the image information of the photographing target which has been output by the geographical information data output unit in the position of the photographing target on a 3-dimensional map in such a manner that the image information is inclined to intersect at a right angle with a photography direction, based on the azimuth angle measured by the azimuth angle measurement element, the elevation/depression angle measured by the elevation/depression angle measurement element, and the coordinate information,

BRIEF DESCRIPTION OF THE DRAWINGS

Exemplary embodiments of the present invention will be described in detail based on the following figures, wherein.

DESCRIPTION OF THE EMBODIMENTS

The exemplary embodiments of the present invention (hereinbelow referred to as embodiments) will now be described.

Figure 1:
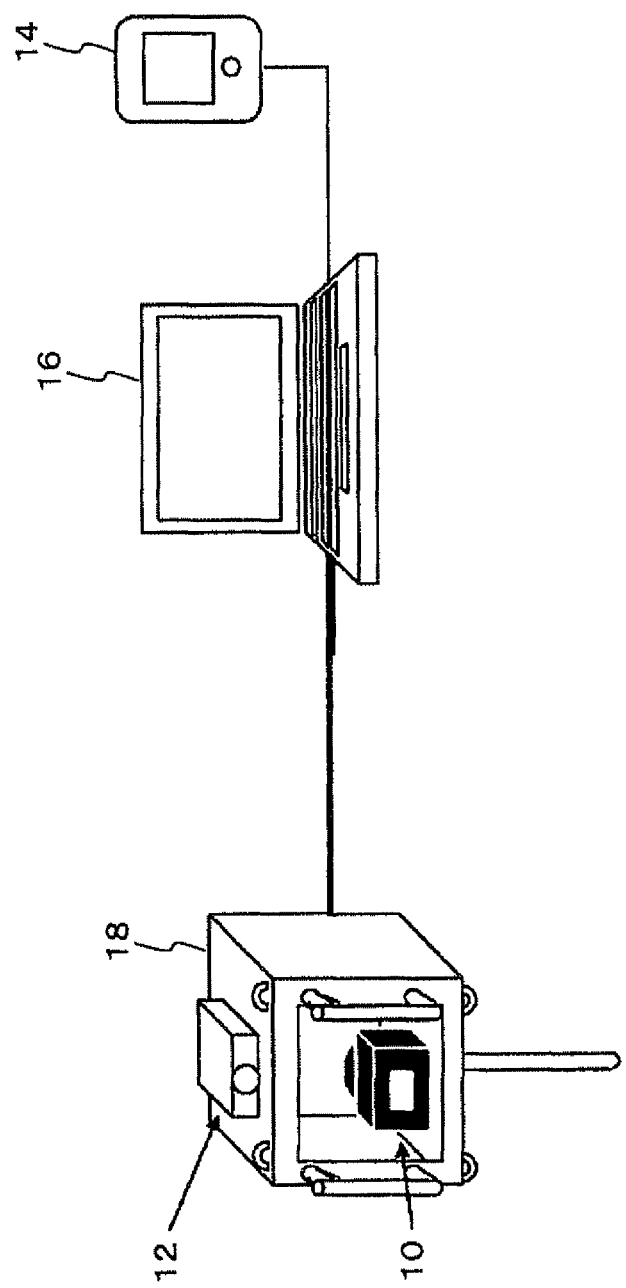
FIG. 1 is a block diagram of a system for generating integrated database of imaged map, according to an embodiment.

FIG. 1 shows a block diagram of a system for generating integrated database of imaged map, according to the embodiment. In FIG. 1, the system for generating integrated database of imaged map includes a photography unit 10, an angle distance measurement unit 12, a coordinate measurement unit 14, and a control unit 16.

The photography unit 10 includes a CCD camera and any other appropriate camera, photographs a target to be photographed (photographing target), and generates image information of the target to be photographed. The photography unit 10 may include a video camera for photographing motion images.

The angle distance measurement unit 12 measures the distance between the photography position of the photography unit 10 and the target to be photographed, and also the azimuth, elevation and depression angles of the photography direction of the photography unit 10. The distance between the photography position and the target to be photographed is measured using a conventionally well-known laser distance measurement unit, for example. The photography direction is, for example, an optical axis direction of a lens of a camera included in the photography unit 10. The optical axis direction of the angle distance measurement unit 12 is adjusted so that a target P to be photographed is aimed, and the azimuth, elevation and depression angles of the photography direction are measured, using the angle distance measurement unit 12. In this measurement unit 12, the optical axis of the camera lens is adjusted in advance approximately parallel to the optical axis of the leaser distance meter included in the angle distance measurement unit 12, from a distance in a range such as between 100 m and 200 m. In this case, the azimuth angle of the photography direction is measured by detecting the geomagnetic horizontal direction component by a conventionally known magnetic sensor. The elevation/depression angles of the photography direction is measured using a conventionally well-known acceleration sensor, for example. When the magnetic sensor is used for measuring the azimuth angle, in some installation places, the sensor may be subject to the influence of the distortion of the magnetic field near its installation place. In this case, the same target is measured from the same place, under the conditions respectively with and without the distortion of the magnetic field around the installation place of the magnetic sensor. The difference between the measured azimuth angles is obtained. The obtained difference is set as a correction value of the azimuth angles. The measurements of the above-described distance and angles by the angle distance measurement unit 12 are performed synchronously to the shutter operation of the photography unit 10. When the motion images are photographed, the above-described measurements may be performed at predetermined time intervals.

The coordinate measurement unit 14 includes a GPS (Global Positioning System) receiver, and measures coordinate values (for example, longitude, latitude, height above the sea) of the photography position of the photography unit 10. When an image of the target to the photographed P is displayed on a planar (two-dimensional) map, there is no need to obtain the coordinate z of the photography position necessary for obtaining the coordinate Zp of the target to the photographed P. The measurement of the above-described coordinate values is performed synchronously to the shutter operation of the photography unit 10. When the motion images are photographed, the above-described coordinate values may be measured at predetermined time intervals. In FIG. 1, the coordinate measurement unit 14 is connected to the control unit 16 through a communication line. This connection is made on the assumption that it is carried by the user himself/herself at the time of photography (for example, it is put in the pocket), and the photography unit 10 and the user stay in the same place. This coordinate measurement unit 14 may be fixed onto a case 18 as will be described later. In this case, the unit 14 is preferably installed in a place close to (1 m to 2 m) the photography unit 10, where electric waves are well received from the GPS satellite (for example, at the window of a helicopter).

The control unit 16 includes a suitable computer, and obtains the coordinate information of a target to be photographed, based on the coordinate values of the photography position measured by the above-described coordinate measurement unit 14, the distance between the photography position and the target to be photographed measured by the angle distance measurement unit 12, and the above-described azimuth, elevation and depression angles. The obtained coordinate information and the image information about the target photographed by the photography unit 10 are output in association with each other.

The photography unit 10 and the angle distance measurement unit 12 are contained in an appropriate case 18 that is operable by the user in hand. This case 18 may contain the control unit 16. Further, the coordinate measurement unit 14 may be contained in the case 18, as long as the coordinate values of the photography position can be measured upon reception of the electric waves from the GPS satellite. The system for generating integrated database of imaged map, according to the embodiment, measures the azimuth angle by detecting the geomagnetic horizontal direction component by the angle distance measurement unit 12. Thus, there is no need to obtain the rotational angle of the camera with respect to the axis fixed onto a mobile object, such as an airplane and a vehicle. Therefore, the azimuth angle can be measured in a state where the user holds the system in hand.

Figure 2:
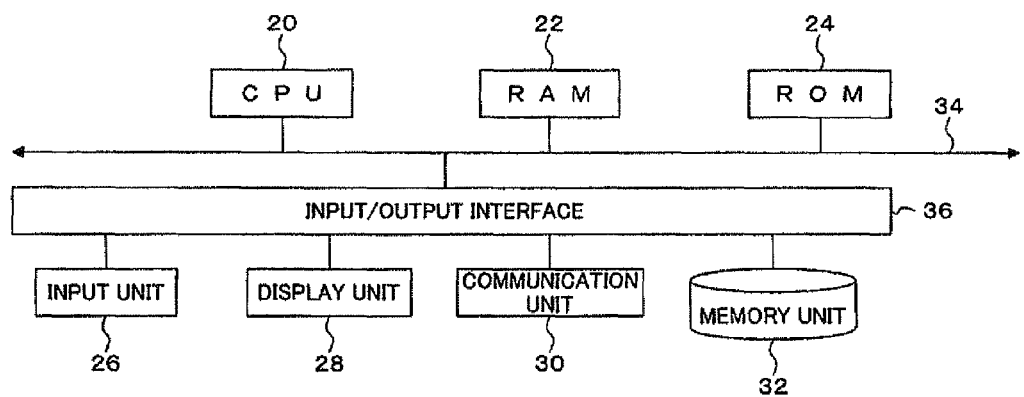
FIG. 2 is a diagram showing an example of a hardware configuration of a computer included in a control unit shown in FIG. 1.

FIG. 2 shows an example of a hardware configuration of a computer included in the control unit 16 shown in FIG. 1. In FIG. 2, the control unit 16 includes a Central Processing Unit (CPU, such as a microprocessor, may be used) 20, a random access memory (RAM) 22, a Read Only Memory (ROM) 24, an input unit 26, a display unit 28, a communication unit 30, and a memory unit 32. These constituent elements are connected with each other through a bus 34. The input unit 26, the display unit 28, the communication unit 30, and the memory unit 32 are respectively connected to the bus 34 through an input/output interface 36.

The CPU 20 controls operations of elements as will be described later, based on a control program stored in the RAM 22 or the ROM 24. The RAM 22 mainly serves as a workspace of the CPU 20, and the ROM 24 stores control programs (for example, BIOS) and any other data used by the CPU 20.

The input unit 26 includes a keyboard and a pointing device or the like, and is used by the user to input operational instructions or the like.

The display unit 28 includes a liquid crystal display, and displays such as the map information and the image information photographed using the photography unit 10.

The communication unit 30 includes a USB (Universal Serial Bus) port, a network port, and any other adequate interface, and is used by the CPU 20 to transmit/receive data to/from an external unit through a communication unit, such as a network. The image information and the measured values regarding the distance and angle are acquired from the photography unit 10, the angle distance measurement unit 12, and the coordinate measurement unit 14, through the communication unit 30.

The memory unit 32 is a magnetic memory unit, such as a hard disk, and stores various data necessary for processes as will be described later. As the memory unit 32, a digital versatile disk (DVD), a compact disk (CD), a magneto-optical disk (MO), a flexible disk (FD), magnetic tape, an Electrically-Erasable Programmable Read Only Memory (EEPROM), and a flash memory may be used, instead of a hard disk.

Figure 3:
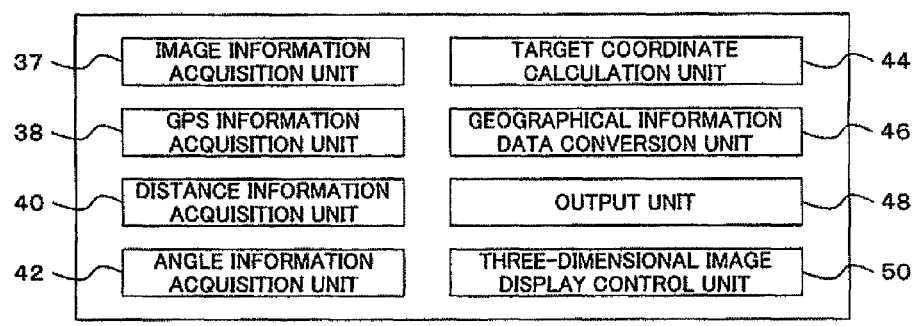
FIG. 3 is a functional block diagram of the control unit, according to the embodiment.

FIG. 3 shows a functional block diagram of the control unit 16, according to the embodiment. In FIG. 3, the control unit 16 includes an image information acquisition unit 37, a GPS information acquisition unit 38, a distance information acquisition unit 40, an angle information acquisition unit 42, a target coordinate calculation unit 44, a geographical information data conversion unit 46, an output unit 48, and a 3-dimensional image display control unit 50. These functions are realized by, for example, the CPU 20 and programs controlling the process operations of the CPU 20.

The image information acquisition unit 37 acquires image information about a target photographed by the photography unit 10. The acquired image information, having suitable identification information added thereto, is output to the geographical information data conversion unit 46. This identification information may be the operation time of the shutter of the photography unit 10. That is, the operation time corresponds to the measurement timings of, for example, the angle distance measurement unit 12 and the coordinate measurement unit 14. In this case, the image information acquisition unit 37 generates a trigger signal for operating the shutter of the photography unit 10. The generation time of the trigger signal is set as identification information. At this time, the trigger signals for operating the shutter may be output synchronously to the angle distance measurement unit 12 and the coordinate measurement unit 14, for performing their corresponding measurements. In an alternative configuration, the trigger signals may be output asynchronously to the angle distance measurement unit 12 and the coordinate measurement unit 14, to perform the measurement, independently from the trigger signal for operating the photography unit 10. The image information acquired by the image information acquisition unit 37 may include motion images, other than still images.

The GPS information acquisition unit 38 acquires coordinate values of the photography position of the photography unit 10 as coordinate information, measured by the coordinate measurement unit 14 synchronously to the shutter operation of the photography unit 10. The coordinate information includes identification information added thereto and representing such as the operation time of the shutter of the photography unit 10, and is referred to determine the corresponding relationship with the image information acquired by the image information acquisition unit 37. To set the time information as identification information, the clock of the control unit 16 is initialized to the time acquired by the coordinate measurement unit 14, to achieve the synchronization. When the GPS information acquisition unit 38 cannot acquire the coordinate information, the coordinate information may be corrected using a known method using a gyroscope, an accelerometer and/or the like.

The distance information acquisition unit 40 acquires distance data that a laser distance meter included in the angle distance measurement unit 12 measures synchronously or asynchronously to the shutter operation of the photography unit 10. This distance data corresponds to the distance between the photography position of the photography unit 10 and the target to be photographed (for example, the value in the unit of meters). When the above-described laser distance meter outputs data in a different form from the distance (for example, a pulse signal), the distance information acquisition unit 40 may calculate the distance between the photography position of the photography unit 10 and the target to be photographed, based on measurement data of the laser distance meter. This distance data also includes identification information added thereto and representing the operation time of the shutter of the photography unit 10 or the like, and is referred to determine the corresponding relationship with the image information acquired by the image information acquisition unit 37.

The angle information acquisition unit 42 acquires the azimuth angle of the photography direction of the photography unit 10 and the elevation/depression angle of the photography direction of the photography unit 10 which has been measured by the acceleration sensor or the like. Note that this azimuth angle of the photography unit 10 has been measured by the magnetic sensor included in the angle distance meter 12 synchronously or asynchronously to the shutter operation of the photography unit 10. The above-described magnetic sensor measures the azimuth angle, as an angle of the photography direction of the photography unit 10 with respect to the magnetic north or as a corrected angle thereof from the true north. The azimuth, elevation and depression angles also include identification information added thereto and representing the operation time of the shutter of the photography unit 10 or the like, and are referred to determine the corresponding relationship with the image information acquired by the image information acquisition unit 37.

The target coordinate calculation unit 44 calculates coordinate information of a target to be photographed. This calculation is made based on the coordinate information of the photography position acquired by the GPS information acquisition unit 38, the distance between the photography position of the photography unit 10 and the target to be photographed, as acquired by the distance information acquisition unit 40, and the azimuth, elevation and depression angles of the photography direction of the photography unit 10 which has been acquired by the angle information acquisition unit 42. This calculation is made using the coordinate information, the distance, and the azimuth, elevation and depression angles that have been determined as having the corresponding relationship based on the identification information. The calculated coordinate information is output, and has identification information added thereto and representing the operation time of the shutter of the above-described photography unit 10 or the like. The target coordinate calculation unit 44 performs an interpolation process for the coordinate information, the distance, and the azimuth, elevation and depression angles. Further, the target coordinate calculation unit 44 adds identification information (operation time of the shutter of the photography unit 10 or the like) to the coordinate information, the distance data, and the angle information (azimuth, elevation and depression angles), acquired after interpolated, thus enabling to determine the corresponding relationship with the image information acquired by the image information acquisition unit 37. Examples of the calculation procedure and the interpolation process will be described later.

The geographical information data conversion unit 46 converts coordinate information of a target which has been obtained by the calculation by the target coordinate calculation unit 44 and image information of a target photographed by the photography unit 10, into a data format of a predetermined geographical information system. An example of the data format of the geographical information system includes the coordinate information and image information corresponding to this coordinate information in association with each other as attribute information. The corresponding relationship between the coordinate information and the image information is made based on the identification information. When an image of a target P to be photographed is displayed on a two-dimensional map, the height above the sea of the target P to be photographed is not necessarily required. In this case, the above-described attribute information may include the height above the sea, to also display the image information on a three-dimensional map.

The output unit 48 outputs and displays the coordinate information and the image information of the target to be photographed, to and on the display unit 28. These coordinate information and the image information are converted into a data format of the geographical information system by the geographical information data conversion unit 46. In this case, for example, the image information of a target to be photographed is associated with a position of the target to be photographed on a predetermined map, based on the coordinate information of the target to be photographed. In addition, the position of the target to be photographed may be clicked (specified the region) using a pointing device of the input unit 26, to display the corresponding image information.

The three-dimensional image display control unit 50 displays the image information of the target to be photographed on a three-dimensional map. At this time, the image is inclined in such a manner that the photography direction of the photography unit 10 intersects (will be a normal line to) the image plane. This display may be done by the display unit 28, or may be done by an external display unit of the system.

Both or one of the output unit 48 and the 3-dimensional image display control unit 50 may be realized on a computer that is different from the control unit 16. In this case, information is sent to the above-described different computer through the communication unit 30.

Figure 4A:
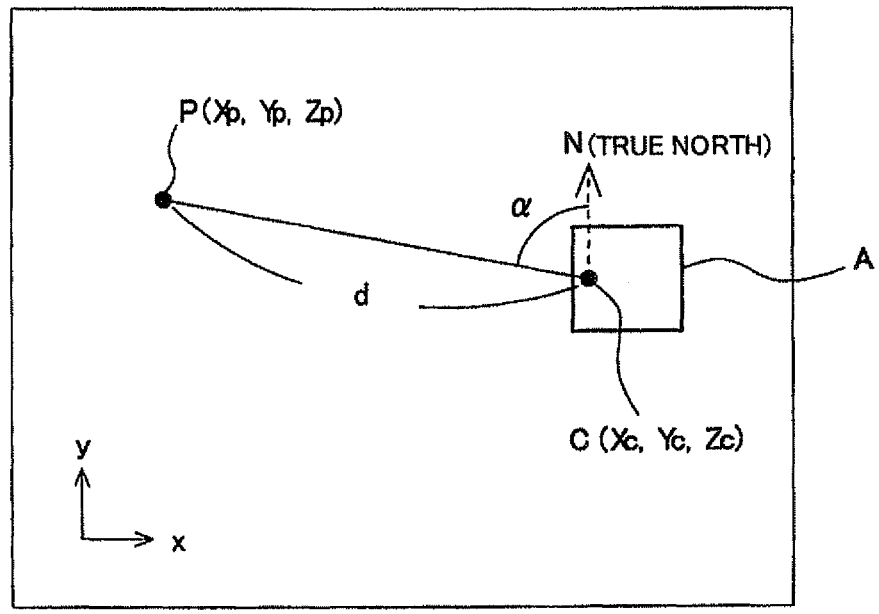
FIG. 4 are explanatory diagrams of a calculation operation of a target coordinate operation unit shown in FIG. 3.
Figure 4B:
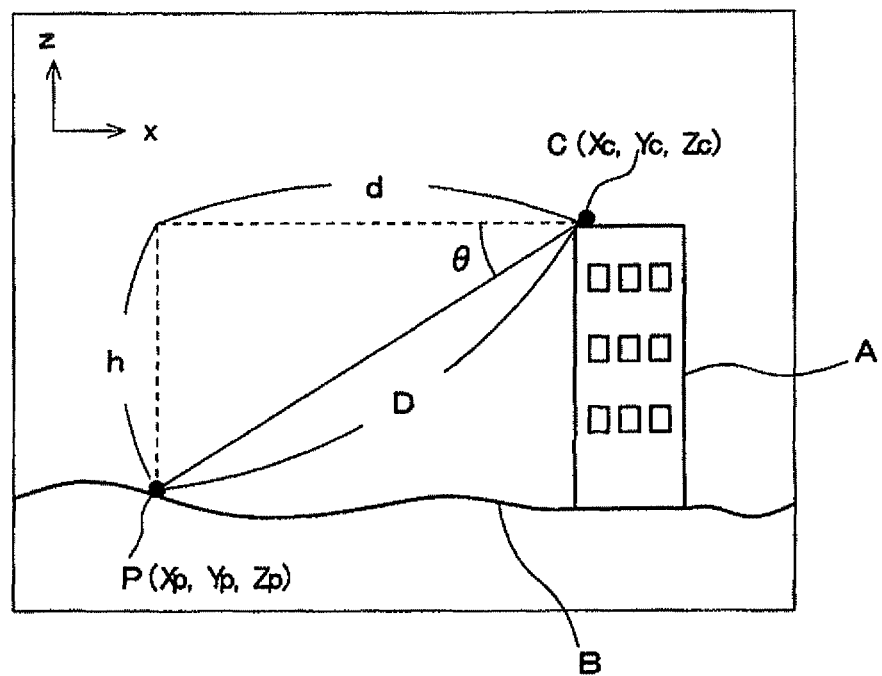

FIG. 4(*a*) and FIG. 4(*b*) show explanatory diagrams of calculation processes of the target coordinate calculation unit 44 shown in FIG. 3. The photography unit 10 and the angle distance measurement unit 12 are operable by the user in hand. FIG. 4(*a*) and FIG. 4(*b*) show examples of photographs of the ground surface. The photographs are taken by the user from the roof of a building while holding the case 18 of the system for generating integrated database of imaged map in hand.

FIG. 4(*a*) is a plane view defined by a coordinate (x, y), and shows a state in which the target P to be photographed is photographed. Specifically, at this time, the target P with an azimuth angle α with respect to the true north N is being photographed from the photography position C on the roof of a building A. A reference symbol d denotes a horizontal distance from the photography position C on the roof of the building A (i.e. the position of the photography unit 10 of the system for generating integrated database of imaged map), to the position of the target P to be photographed. In FIG. 4(*a*), x-direction and y-direction are respectively shown with arrows.

FIG. 4(*b*) is a side surface view defined by a coordinate (x, z), and shows a state in which the target P to be photographed on a ground surface B is photographed downward from the roof of the building A having a height h. In this case, the photography direction (direction of the elevation/depression angle) is the depression angle of angle θ. A reference symbol D denotes the distance between the photography position C and the target P to be photographed. In FIG. 4(*b*), x-direction and z-direction are respectively shown with arrows.

The above-described azimuth angle α, the depression angle θ, and the distance D use values measured by the angle distance measurement unit 12. When the azimuth angle α measured by the angle distance measurement unit 12 is an angle from the magnetic north, a value corrected as an angle from the true north is used. These values are acquired by the distance information acquisition unit 40 and the angle information acquisition unit 42, and are given to the target coordinate calculation unit 44. The target coordinate calculation unit 44 calculates the coordinate information of the target P to be photographed, using the above values and the coordinate information of the photography position C acquired by the GPS information acquisition unit 38. The equation for this calculation is as follows.

When a coordinate of the target P to be photographed is (Xp, Yp, Zp), and a coordinate of the photography position C is (Xc, Yc, Zc).

$Xp=Xc-d\cdot\sin\alpha$ $Yp=Yc+d\cdot\cos\alpha$ $Zp=Zc-D\cdot\sin\theta$ (1)

In this case, d=D·cos θ, and h=D·sin θ.

When the coordinate values of the photography position C are acquired in longitude, latitude, and height from the sea, the coordinate of the target P to be photographed is obtained by Equation (2).

$Xp=Xc-d\cdot\sin\alpha/Kx$ $Yp=Yc+d\cdot\cos\alpha/Ky$ $Zp=Zc-D\cdot\sin\alpha$ (2)

In this case, Kx is a distance per degree of longitude at a latitude Yc, and Ky is a distance per degree of latitude.

The geographical information data conversion unit 46 sets the coordinate information of the target P to be photographed and the image information thereof in association with each other, based on the thus-obtained coordinate information of the target P to be photographed. In this case, the unit 46 sets a predetermined area including a point (pixel) expressed by the above-described coordinate (Xp, Yp, Zp) on the map information, in association with map information of the target P photographed by the photography unit 10. As a result, the associated image information can be displayed by clicking the above-described area on the map displayed on the display unit 28 for example, using the pointing device of the input unit 26. At this time, this image information is displayed near the associated coordinate (Xp, Yp, Zp). When the above-described image information is displayed and clicked, its association area (position of the target P to be photographed) on the map may be blinking or displayed with different colors, for example. Further, a plurality of character strings (for example, place names) representing the above-described image information may be formed in a list. While this list is displayed on the display unit 28, the character string is clicked on, thereby displaying one or both of the corresponding image information and the area on the map in association with the image information. In this embodiment, the descriptions have been made to an example of displaying the corresponding image information on the three-dimensional map. However, there is no need to obtain the coordinate Zp when displaying on the two-dimensional map.

Accordingly, in the example of the above-described embodiment, the user photographs the target P to be photographed while the user holds the case 18 of the system for generating integrated database of imaged map in hand. However, the photographing may be achieved from an aircraft, such as an airplane or a helicopter.

When the angle distance measurement unit 12 measures the distance between the photography position and the target P to be photographed, and the azimuth, elevation and depression angles, the measurement is performed in the optical axis direction of the angle distance measurement unit 12, as described above. The distance is measured based on the assumption that the target P to be photographed (for example, ground surface) exists in the optical axis direction. However, the shutter of the photography unit 10 may be pressed along a direction where there is no target P to be photographed, due to unintentional movement of the photography direction. At this time, the laser beam emitted from the angle distance measurement unit 12 cannot be reflected, thus failing to measure the distance, because of the photography direction toward the sky, for example. In this case, linear interpolation is performed for a point(s) between which the distance has been measured, and the distance of points that has not been measured may be added.

Figure 5:
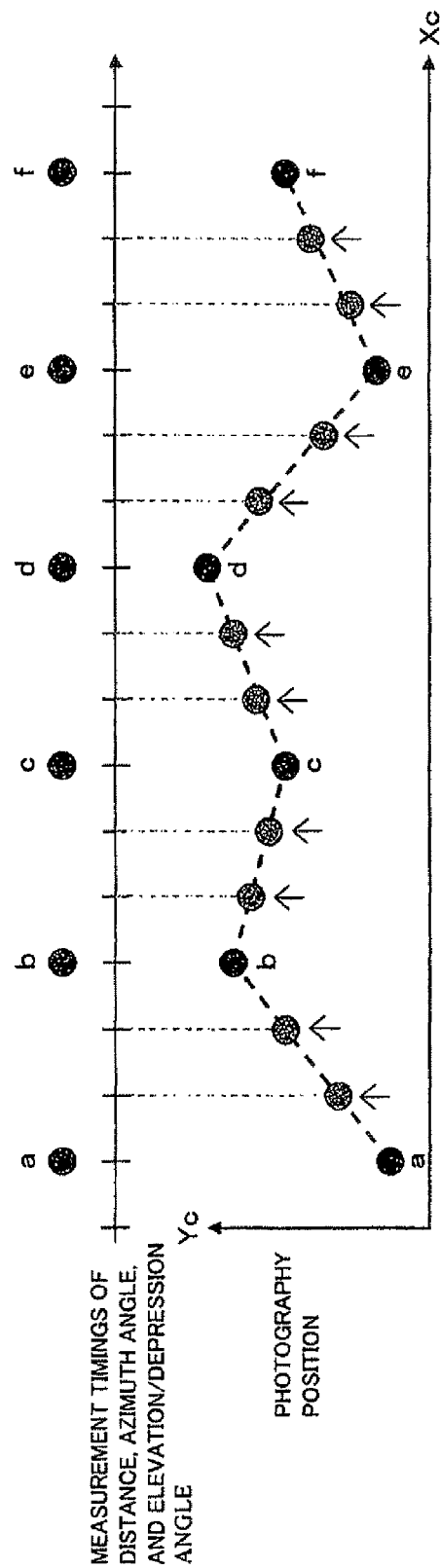
FIG. 5 is an explanatory diagram of a process for giving a distance for a point at which the distance between the photographed position and the target to be photographed could not be measured.

FIG. 5 shows an explanatory diagram of a process (interpolation process) for interpolating a missing value(s) for a point. With respect to this point, a part or all of the distance from the photography position to the target to be photographed, azimuth angle, elevation and depression angles are missing. In FIG. 5, the upper row shows the distance and the measurement timings of the azimuth, elevation and depression angles (a black circle shows a successful measurement of the distance at the photographing), while the lower row shows the photography position (Xc, Yc) with a black circle. FIG. 5 shows an example of a case in which the target to be photographed is photographed from an airplane.

In FIG. 5, no missing value (for example, distance) is found at points a, b, c, d, e, and f, at the photographing of the target to be photographed. Any other points (indicated with up-pointing arrows) correspond to the points of the missing values (for example, distance) at the photography of the target to be photographed. For the points of the missing values, the distance information acquisition unit 40 and the angle information acquisition unit 42 calculate interpolation values for the points of the missing values using a linear interpolation method, based on the measurement data of the points a, b, c, d, e, and f. As the interpolation values, the distance information acquisition unit 40 calculates the value of the distance, while the angle information acquisition unit 42 calculates the azimuth, elevation and depression angles. For example, the distance data is not measured between the points a and b, but there are two points of the photography position data acquired at predetermined time intervals. Thus, a ⅓ value and a ⅔ value out of a difference between the distance data at the point a and the distance data at the point b are subtracted from the distance data at the point b, thereby obtaining the distance data at the two points. This procedure can be applied for any other points with the missing distance data. FIG. 5 shows an example of a case in which the distance data is acquired synchronously to the shutter operation. In the asynchronous case, the distance data can similarly be interpolated, using a time difference between the photography timing of the target to be photographed and the timing for measuring the distance. The azimuth, elevation and depression angles can similarly be interpolated. When the coordinate information is missing in the GPS, the interpolation can similarly be performed.

Figure 6:
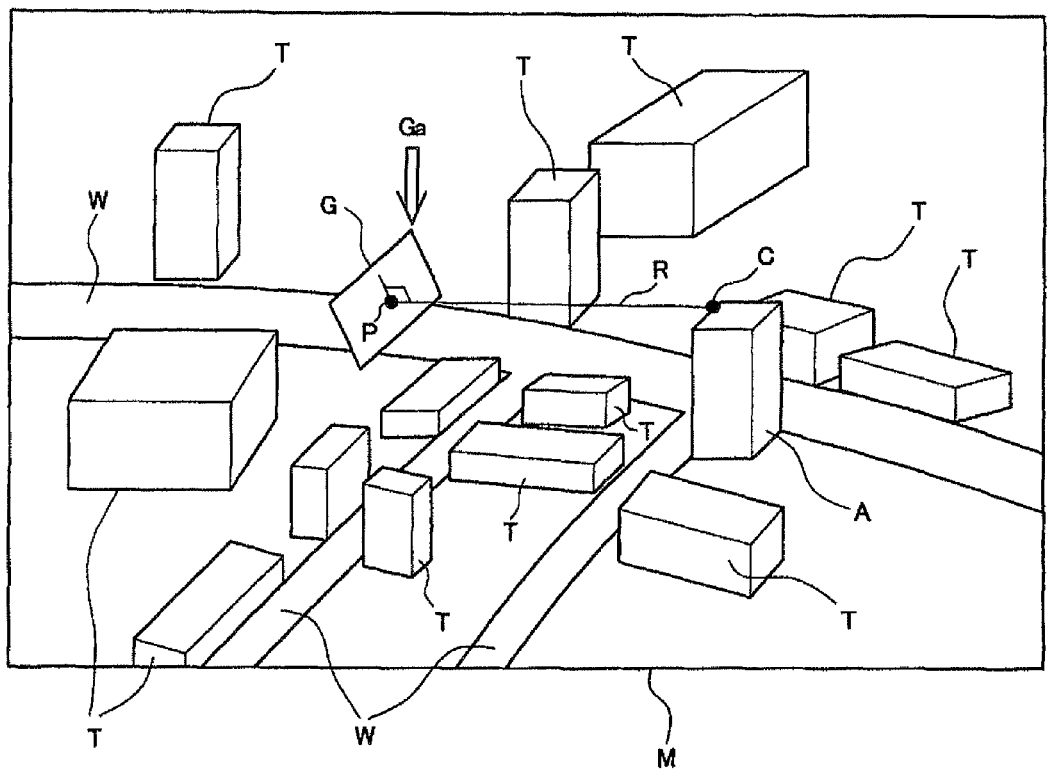
FIG. 6 is an explanatory diagram of a process operation of a 3-dimensional image display control unit shown in FIG. 3.

FIG. 6 shows an explanatory diagram of a process operation of the three-dimensional image display control unit 50 shown in FIG. 3. In the example of FIG. 6, the target P to be photographed is photographed in a depression angle (downward) from the photography position C on the roof of the building A. The photography position C and the target P to be photographed are shown on a three-dimensional map M. The three-dimensional map M is a map on which the buildings A and T and a road W are displayed in three dimensions. In this case, the three-dimensional image display control unit 50 displays an image G of the photographed target P photographed by the photography unit 10 on the three-dimensional map M in such a manner that the image is inclined to intersect at a right angle with the photography direction R. This display is performed based on the measurement of the angle distance measurement unit 12 synchronously to the shutter operation of the photography unit 10, and also based on the azimuth, elevation and depression angles acquired by the angle information acquisition unit 42. The display position of the image G corresponds to a position on the three-dimensional map M corresponding to the coordinate information of the target P to be photographed calculated by the target coordinate calculation unit 44. As illustrated in FIG. 6, the image G may be indicated by an arrow Ga, and a photography direction R may be displayed. The coordinate of the target P to be photographed is the center of the image G.

According to the above-described configuration of the 3-dimensional image display control unit 50, the target P to be photographed can be emphasized on the three-dimensional map M. As a result, the user can easily recognize the necessary image G on the three-dimensional map.

In the above-described embodiment, the image G is displayed on the three-dimensional map. On a map of the very big city with tall buildings, for example, the image G may be hidden behind the buildings and go disappeared. In this case, the height of the entire buildings on the three-dimensional map or the buildings between the image G and the visual point may preferably be lowered, or may be displayed as 0 (for example, orthographic imaging).

Figure 7:
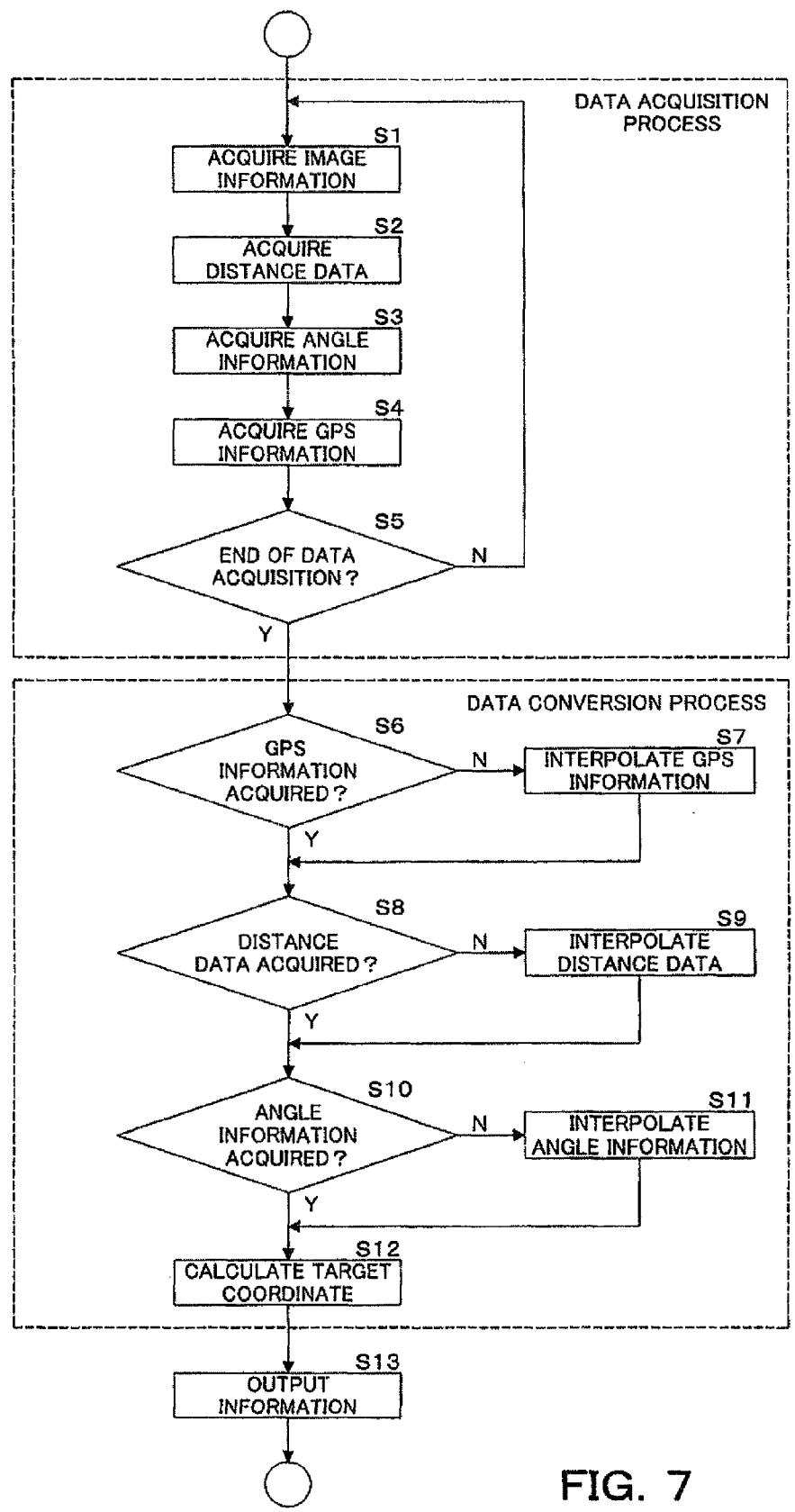
FIG. 7 is a flow diagram of an operation example of the control unit, according to the embodiment.

FIG. 7 shows a flow of an operation example of the control unit 16 according to this embodiment. The process of this system is divided into two major processes: a data acquisition process and a data conversion process. The data acquisition process is to acquire image information of the target to be photographed synchronously or asynchronously to the shutter operation of the photography unit 10, the distance data between the photography position and the target to be photographed, the azimuth, elevation and depression angles of the photography direction, and the coordinate information of the photography position. The data conversion process is to check each acquired data after the above-described data acquisition process, to interpolate the data if there is any missing value, and to calculate the coordinate information of the target to be photographed. The data acquisition process will now be described. In FIG. 7, when an instruction of starting the photographing is input, the image information acquisition unit 37 acquires image information of the target photographed by the photography unit 10, and outputs the acquired information to the geographical information data conversion unit 46 (S1).

The distance information acquisition unit 40 acquires distance data between the photography position of the photography unit 10 and the target to be photographed, and outputs the acquired distance data to the target coordinate calculation unit 44 (S2). This distance data has been measured by the angle distance measurement unit 12. The angle information acquisition unit 42 acquires the azimuth, elevation and depression angles of the photography direction of the photography unit 10 that are measured by the angle distance measurement unit 12, and outputs the acquired data to the target coordinate calculation unit 44 (S3). The step of acquiring the distance data (S2) and the step of acquiring the azimuth, elevation and depression angles (S3) may be performed in the opposite order.

The GPS information acquisition unit 38 acquires the coordinate information of the photography position of the photography unit 10 from the coordinate measurement unit 14, in conformity with such as the timing of the trigger signal for operating the shutter of the photography unit 10 (S4). The GPS information acquisition unit 38 checks whether there is an instruction of ending the data acquisition (S5). When the data acquisition is not ended, the flow returns to S1 for continuing the data acquisition. When the data acquisition is to be ended, the flow shifts to the data conversion process. As a result, a series of data in association with the target to be photographed can be acquired. Note that this series of data includes image information of the target to be photographed, the distance data between the photography position and the target to be photographed, the azimuth, elevation and depression angles of the photography direction, and the coordinate information of the photography position.

The data conversion process will now be described. A determination is made as to whether the coordinate information has been acquired in S4 (S6). When the coordinate information has not been acquired, the target coordinate calculation unit 44 performs an interpolation process for the coordinate information (S7). The target coordinate calculation unit 44 affixes the above-described identification information to the acquired coordinate information and the coordinate information acquired through the interpolation process.

A determination is made as to whether the distance data has been acquired in S2 (S8). When the distance data has not been acquired, the target coordinate calculation unit 44 performs the interpolation process (S9). The target coordinate calculation unit 44 affixes the above-described identification information to the distance data acquired in S2 and the distance data acquired in the interpolation process.

A determination is made as to whether the angle information has been acquired in S3 (S10). When the angle information has not been acquired, the target coordinate calculation process 44 performs the interpolation process (S11). The target coordinate calculation unit 44 affixes the above-described identification information to the angle information acquired in S3 and the angle information acquired through the interpolation process.

The target coordinate calculation unit 44 calculates coordinate information of a target to be photographed (S12), based on the above-described equations (1) and (2). The calculation is performed using the distance data, data of the azimuth, elevation and depression angles, and data of the coordinate information, which have been determined as having the corresponding relationship and acquired in S2, S3, and S4 or interpolated in S7, S9, and S11.

Finally, the image information of the target acquired by the image information acquisition unit 37 in S1 and the coordinate information calculated by the target coordinate calculation unit 44 in S12 are set in association with each other by the geographical information data conversion unit 46, and are displayed on the display unit 28 by the output unit 48 (S13). These associated image information and coordinate information may be sent to an external computer as data of the geographical information system through the communication unit 30.

The program for executing the steps of FIG. 7 may be stored on a recording medium, and may be provided with a communication unit. In this case, for example, the above-described program may be comprehended as an invention of a computer readable recording medium which records a program or an invention of a data signal.

Although the exemplary embodiments of the invention have been described above, many changes and modifications will become apparent to those skilled in the art in view of the foregoing description which is intended to be illustrative and not limiting of the invention defined in the appended claims.

The invention claimed is:

1. A system for generating integrated database of imaged map, comprising:
a photographing target position specification unit including
a photography element which photographs a photographing target in an arbitrary photography direction from an arbitrary photography position,
a distance measurement element which includes a laser distance meter for measuring a distance between the photography position and the photographing target,
an azimuth angle measurement element which measures an azimuth angle of the photography direction based on geomagnetism,
an elevation/depression angle measurement element which measures an elevation/depression angle of the photography direction,
a coordinate measurement element which measures a coordinate of the photography position, and
a photographing target coordinate calculation element which calculates coordinate information of the photographing target, based on the coordinate of the photography position, the distance, the azimuth angle, and the elevation/depression angle;
a geographical information data output unit which outputs data on a geographical information system, the data including image information of the photographing target photographed by the photography element and the coordinate information of the photographing target which is calculated by the photographing target coordinate calculation element in association with each other; and
a display unit which displays the image information of the photographing target that is output by the geographical information data output unit, in a position of the photographing target on a map based on the coordinate information, and wherein
the display unit displays the image information of the photographing target which has been output by the geographical information data output unit in the position of the photographing target on a three-dimensional map in such a manner that the image information is inclined to intersect at a right angle with a photography direction, based on the azimuth angle measured by the azimuth angle measurement element, the elevation/depression angle measured by the elevation/depression angle measurement element, and the coordinate information.

2. The system for generating integrated database of imaged map according to claim 1, wherein
the photographing target coordinate calculation element performs an interpolation process for the distance, when an optical axis of the laser distance meter included in the distance measurement element is oriented in a direction in which laser light cannot be reflected, or when a timing of photographing the photographing target is asynchronous to a timing of measuring the distance.

3. A non-transitory computer readable medium storing instructions for controlling an electronic processor to function as:
an image information acquisition element which acquires image information representing a photographed photographing target in an arbitrary photography direction from an arbitrary photography position using a photography element;
a distance information acquisition element which acquires a measurement result of a distance between the photography position and the photographing target;
an azimuth angle acquisition element which acquires a measurement result of an azimuth angle in the photography direction;
an elevation/depression angle acquisition element which acquires a measurement result of an elevation/depression angle in the photography direction;
a coordinate information acquisition element which acquires a coordinate of the photography position;
a photographing target coordinate calculation element which calculates coordinate information of the photographing target, based on the coordinate of the photography position, the distance, the azimuth angle, and the elevation/depression angle;
a geographical information data output element which outputs data on a geographical information system, the data including the image information of the photographing target acquired by the image information acquisition element and the coordinate information of the photographing target calculated by the photographing target coordinate calculation element in association with each other; and a display element which displays the image information of the photographing target that is output by the geographical information data output element, in a position of the photographing target on a map based on the coordinate information, and wherein the display element displays the image information of the photographing target which has been output by the geographical information data output element in the position of the photographing target on a three-dimensional map in such a manner that the image information is inclined to intersect at a right angle with the photography direction, based on the azimuth angle acquired by the azimuth angle acquisition element, the elevation/depression angle acquired by the elevation/depression angle acquisition element, and the coordinate information.

4. A method, comprising:

acquiring image information representing a photographed photographing target in an arbitrary photography direction from an arbitrary photography position using a photography element;

acquiring a measurement result of a distance between the photography position and the photographing target;

acquiring a measurement result of an azimuth angle in the photography direction;

acquiring a measurement result of an elevation/depression angle in the photography direction;

acquiring a coordinate of the photography position;

calculating coordinate information of the photographing target, based on the coordinate of the photography position, the distance, the azimuth angle, and the elevation/depression angle;

outputting data, on a geographical information system, the data including the acquired image information of the photographing target and the calculated coordinate information of the photographing target in association with each other; and displaying the image information of the photographing target that is output, in a position of the photographing target on a map based on the coordinate information, wherein the displaying of the image information is displayed on a three-dimensional map in such a manner that the image information is inclined to intersect at a right angle with the photography direction, based on the acquired azimuth angle, the acquired elevation/depression angle, and the coordinate information.

* * * * *